US006258305B1

United States Patent
Brinker et al.

(10) Patent No.: US 6,258,305 B1
(45) Date of Patent: Jul. 10, 2001

(54) METHOD FOR NET-SHAPING USING AEROGELS

(75) Inventors: C. Jeffrey Brinker; Carol S. Ashey; Scott T. Reed, all of Albuquerque, NM (US); Chunangad S. Sriram, Indianapolis, IN (US); Thomas M. Harris, Tulsa, OK (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/539,199

(22) Filed: Mar. 29, 2000

Related U.S. Application Data

(60) Provisional application No. 60/126,709, filed on Mar. 29, 1999.

(51) Int. Cl.⁷ .................................................. B29C 71/00
(52) U.S. Cl. ........................ 264/101; 264/232; 264/234; 264/299; 264/319; 264/621
(58) Field of Search .................................. 264/101, 232, 264/234, 299, 319, 621

(56) References Cited

U.S. PATENT DOCUMENTS

| 2,249,767 | 7/1941 | Kistler ................................. 252/273 |
| 3,672,833 | 6/1972 | Nicholaon et al. ..................... 23/182 |
| 4,610,863 | 9/1986 | Tewari et al. ........................ 423/338 |
| 4,667,417 | * 5/1987 | Graser et al. ............................ 34/9 |
| 5,242,647 | * 9/1993 | Poco ..................................... 264/225 |
| 5,275,796 | * 1/1994 | Tillotson et al. .................... 423/338 |
| 5,565,142 | 10/1996 | Deshpande et al. ............... 252/315.2 |
| 5,686,031 | * 11/1997 | Coronado et al. .................. 264/40.1 |
| 5,948,482 | 9/1999 | Brinker et al. ..................... 427/430.1 |

* cited by examiner

*Primary Examiner*—Christopher A. Fiorilla
(74) *Attorney, Agent, or Firm*—Elmer A. Klavetter

(57) ABSTRACT

A method of net-shaping using aerogel materials is provided by first forming a sol, aging the sol to form a gel, with the gel having a fluid component and having been formed into a medium selected from the group consisting of a powder, bulk material, or granular aerobeads, derivatizing the surface of the gel to render the surface unreactive toward further condensation, removing a portion of the fluid component of the final shaped gel to form a partially dried medium, placing the medium into a cavity, wherein the volume of said medium is less that the volume of the cavity, and removing a portion of the fluid component of the medium. The removal, such as by heating at a temperature of approximately less than 50° C., applying a vacuum, or both, causes the volume of the medium to increase and to form a solid aerogel. The material can be easily removed by exposing the material to a solvent, thereby reducing the volume of the material. In another embodiment, the gel is derivatized and then formed into a shaped medium, where subsequent drying reduces the volume of the shaped medium, forming a net-shaping material. Upon further drying, the material increases in volume to fill a cavity. The present invention is both a method of net-shaping and the material produced by the method.

22 Claims, 2 Drawing Sheets

Shrunken aerobeads → Deformation & expansion → Aerogel-filled cavity → Reshrink aerogel to remove

METHOD FOR NET-SHAPING USING AEROGELS

This application claims the benefit of U.S. Provisional Application No. 60/126,709, filed on Mar. 29, 1999.

This invention was made with Government support under Contract No. DE-AC04-94AL85000 awarded by the Department of Energy. The Government has certain rights in the invention.

BACKGROUND OF THE INVENTION

The invention relates generally to the field of aerogels, and more particularly to a method of using aerogels to form net-shaped materials and perform net-shaping.

Aerogels are unique solids with up to 99% porosity. Such large porosities confer a number of useful properties on aerogels, including high surface area, low refractive index, low dielectric constant, low thermal-loss coefficient, and low sound velocity. To date, however, the potential of aerogels has not generally been realized in these applications because conventional supercritical aerogel processing is energy intensive and often dangerous. Silica aerogels, with thermal conductivities as low as 0.02 W/mK, have potential utility in superinsulation systems.

Traditionally, aerogels are made by processes whereby the liquid contained within the continuous network of pores of a gelatinous solid is replaced by air. Typically, this is achieved by supercritical solvent extraction, i.e., by placing the gel in an autoclave where the temperature and pressure is increased above the critical point of the liquid phase. This process was initially proposed by Kistler (Kistler, U.S. Pat. No. 2,249,767) to avoid the shrinkage and cracking of porous materials (water filled) due to capillary forces generated during simple evaporative drying. Improvements to Kistler's process were developed. Notably, Nicolaon and Teichner (Nicolaon et al., U.S. Pat. No. 3,672,833) supercritically dried silica gels under conditions exceeding the critical point (240° C., 78.5 atm) of the methanol solvent contained within the pores of a gel. Tewari and Hunt (U.S. Pat. No. 4,610,863) developed a process whereby the initial pore fluid (alcohol) is exchanged for carbon dioxide (31° C., 72.9 atm), thus reducing the temperature required for processing and enhancing process safety by the elimination of flammable solvents at high pressure.

In another advance in aerogel processing, Deshpande et al. (Deshpande et al., U.S. Pat. No. 5,565,142; incorporated herein by reference) describe a means for surface modification of the wet precursor gel to change the contact angle of the fluid meniscus in the pores during drying to avoid shrinkage of the gel. In another advance in aerogel processing, Brinker et al. (Brinker et al., U.S. Pat. No. 5,948,482; incorporated herein by reference) describe a low temperature/pressure (LTP) process to form thin films, eliminating the need for supercritical processing by chemical derivatization of the wet gel surface, followed by simple drying under ambient temperature and pressure conditions. The chemical surface treatment causes the drying shrinkage of the thin films to be reversible: during drying the gel thin film shrinks, then re-expands to recreate the porosity and volume of the wet gel state.

Because aerogels are made by sol-gel processing, their microstructure can be tailored to optimize properties desired for specific applications. Various precursors, including metal alkoxides, colloidal suspensions, and a combination of both under several mechanisms of gelation may be used to synthesize gels. Aerogels can also be made from wet precursor gels that contain both inorganic and organic components or from organic gels. For the composite gels, the organic and inorganic phases can be mixed on different length scales such that the organic component resides solely on the internal pore surface, is incorporated into the spanning gel structure, or forms a separate gel structure from the inorganic phase.

Some applications, such as insulation with a cavity of a complex shape, require materials that can form to the shape of the mold or cavity and provide desired properties. In some applications, foams are suitable materials for such uses. Aerogels, with their high porosity and low thermal conductivities, could be used for such applications. However, aerogels have not been used because the inherent limitations of conventional supercritical routes to aerogels, such as high pressure autoclave processing and difficult processing of large or complex shapes, have contributed to high processing costs and thus have severely restricted successful commercial development of aerogel processes for these type of applications.

Virtually all existing aerogel processes for the fabrication of bulk aerogel materials, including supercritical processing and low temperature/pressure (LTP) processing, depend upon expensive molding and machining techniques to fabricate parts with controlled geometries. For example, to obtain shaped articles using conventional processes, one must cast the sol into a suitable mold and process the gel in a pressure chamber (such as an autoclave) that is large enough to contain the molded shape. These processes are suitable, albeit expensive, for small simple shapes; however, they are unsuitable for complex shapes or for applications that demand cost-effective manufacturing. For most applications, current techniques impose severe restrictions to facile manufacturing; for example, molding technology requires precision mold machining, casting technology, mold material compatibility, custom mold design, effective mold release agents, and controlled part shrinkage while cost-effective machining of aerogels is difficult due to their fragility. Some of these limitations can be overcome by the use of granular aerogel materials, which are more manufacturable but are unsuitable for many applications requiring bulk shapes because of the large voids between granules.

Useful would be a method of preparing net-shape aerogel materials for a range of applications that avoids the disadvantages and limitations inherent in conventional supercritical processing and exploits and improves upon the advantages of recent low temperature/pressure (LTP) processing.

SUMMARY OF THE INVENTION

According to the present invention, a method of net-shaping using aerogel materials is provided by forming a sol, aging the sol to form a gel, the gel having a fluid component, forming the gel into a final shaped gel material, derivatizing the final shaped gel material to render the material unreactive toward further condensation, removing a portion of the fluid component of the final shaped gel material to form a partially-dried medium, placing the partially-dried medium into a cavity, with the volume of the medium being less than the volume of the cavity, and removing a portion of the fluid component of the medium. This removal causes the volume of the medium to increase, thereby forming a net-shaped material. The steps of forming a gel and a final shaped gel material can take place in any order after the formation of the sol. The sol comprises at least one metal oxide, metalloid oxide, hydroxide, alkoxide, oxohydroxide, or oxoalkoxide. The aging occurs by a method selected from the group consisting of heating the sol, adding an acid to the sol, and adding a base to the sol. The step of derivatizing the final shaped gel material is performed by adding a derivatizing agent, where the derivatizing agent can be an organofunctional silane, an alcohol amine, a carboxylic acid, and a β-diketonate, such as trimethylchlorosilane and hexamethyidisilazane. The fluid component can be removed by heating, applying a vacuum, or both. The final shaped gel material can be a variety of materials, including a powder, bulk material, and granules. Upon adding a solvent to the net-shaped material, the material is again reduced in volume, thereby facilitating removal of the material from said cavity.

In another embodiment, a method is provided to first form a sol, the sol is aged to form a gel, the gel is then derivatized to render the material unreactive toward further condensation and the gel is formed into a final shaped gel material, thereby creating newly-exposed surfaces. These surfaces can be optionally be derivatized again. A portion of the fluid component of the final shaped gel material is removed to form a partially-dried medium, with the partially-dried medium having the property of increasing in volume upon subsequent drying. This medium can be stored for lengthy periods of time (such as weeks to months under proper environmental conditions to prevent moisture addition or drying). The material can then be placed into a cavity and more of the fluid component removed, causing the volume of the medium to increase, thereby forming a net-shaped material.

The present invention is both a method of net-shaping and the material produced by the method.

DETAILED DESCRIPTION OF THE INVENTION

The present invention provides a method to utilize aerogel materials to perform net-shaping without the constraints of supercritical solvent extraction (high-pressure environment). Net-shaping occurs when a material, such as an aerogel material, is placed in an enclosure, of a larger volume than the material, and the material is subsequently processed to cause the material to increase in volume to fill or more completely fill the enclosed space as each individual piece of the material attempts to expand to its original volume. The enclosure can provide either total containment or be open to the outside environment.

Brinker et al. (Brinker et al., U.S. Pat. No. 5,948,482) describe the preparation of aerogel thin films where the gel surfaces have been prepared to be unreactive towards condensation reactions. The resulting aerogel thin film can undergo reversible shrinkage. Interestingly, under proper processing conditions to control the drying of the gel, these aerogel materials can be utilized in large-scale applications as "net-shaping" materials. In accordance with the present invention, bulk aerogel materials are prepared which can be subsequently be placed into an enclosure, such as a closed container or a partially opened container, and additional solvent removed to allow the material to increase in volume to the extent desired to more completely fill, or completely fill, the container. For example, in one application for utilizing the method of the present invention, a thermal battery could be isolated from its casing by providing aerogel insulation between the two. A partially dried medium, such as aerogel beads (aerobeads) or granules, with a volume significantly less than the volume of the cavity to be filled, can be poured into the cavity gap between the battery and the casing and, upon solvent removal, the aerogel material increases in volume, perhaps by several times, to fill the gaps (both the gaps between granules and the gap between granules and cavity walls) with aerogel. This aerogel property can be used to form custom aerogel shapes for a variety of applications. Moreover, the partially dried medium can be formed and stored for later use.

Figure 1:
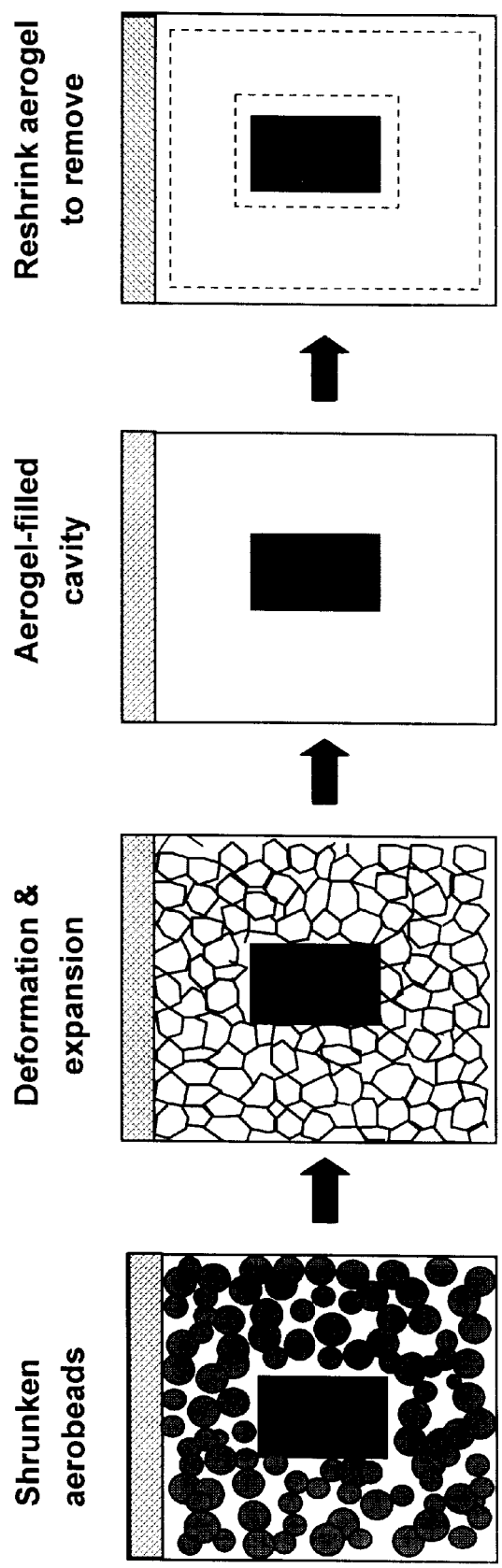
FIG. 1 shows an illustration of the method to produce net-shaped materials.
Figure 2:
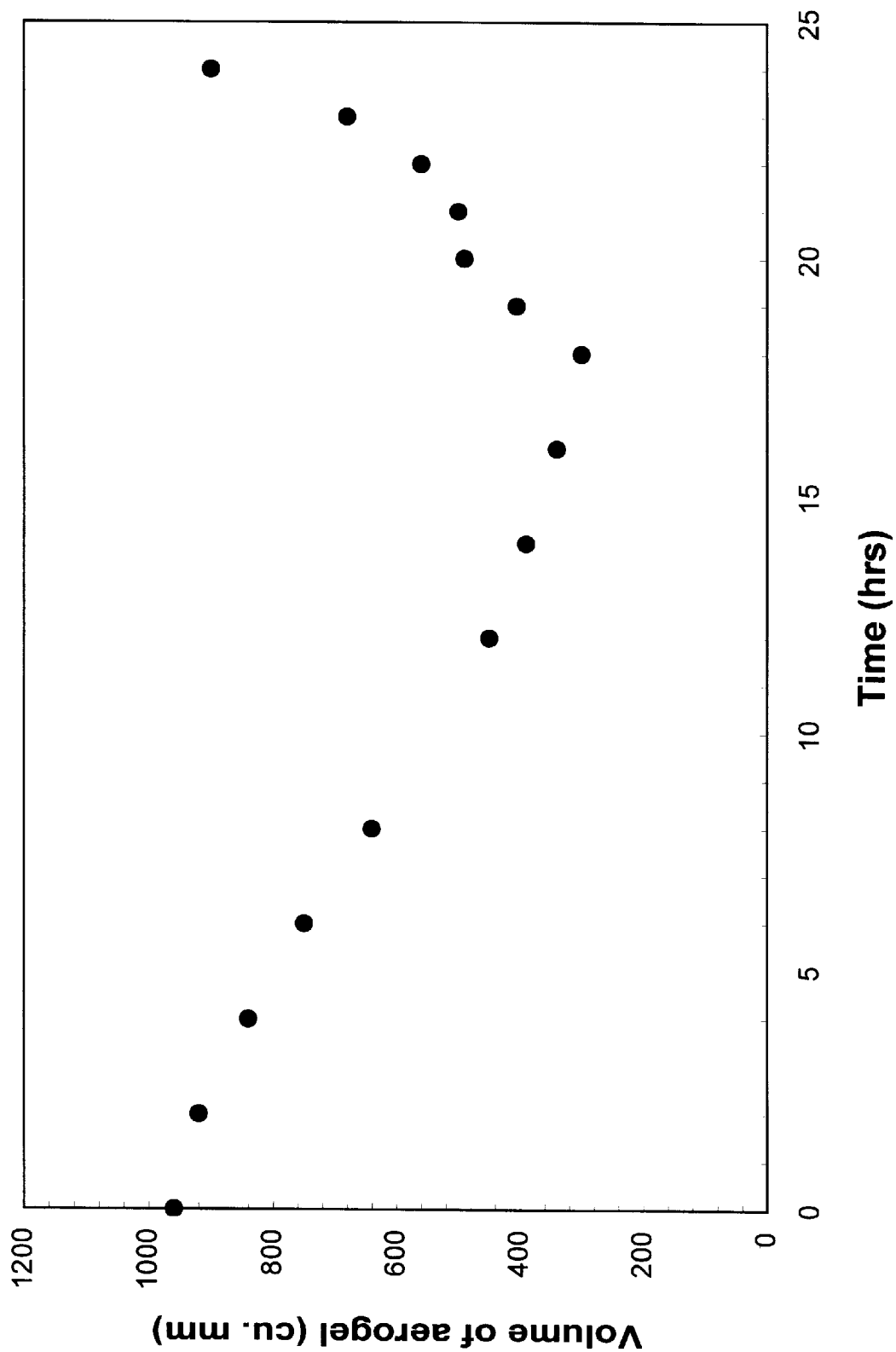
FIG. 2 shows the change in volume of the material as a function of time and drying.

According to the method of the present invention, in one embodiment, a sol material is first prepared. The sol can then be aged to form a gel and the gel formed into a final shaped material, such as a powder, as bulk material, and as granules (i.e., aerobeads). In the method of the present invention, the gel can be formed simultaneously with the shaping process, the sol can be formed into a shape and then aged into a gel or the sol can be aged into a gel and then formed into a final shape. For example, the sol can be formed into granules and form into a gel as the granules are formed. The final shaped material can be formed by such means as spray-drying or other conventional aerosol processing techniques, casting, forming, ultrasonic processing, and forming techniques using immiscible liquids. The exposed surfaces of the final shaped material are derivatized by reacting reactive terminal sites existing on the surfaces of the gel material in the final shaped material to render the surfaces unreactive toward further condensation. The gel is partially dried so that at least a portion of the fluid portion of the gel is removed, with the final shaped material decreasing in volume. The formed, partially-dried material can be stored for later use or immediately be put into the void space in some enclosure (hereafter referred to as a cavity). Upon removal of more of the fluid portion of the partially-dried material, such as by drying, the material will "springback" to completely fill the cavity (as illustrated in FIG. 1). Drying can be accomplished at relatively low temperatures, such as less than approximately 50° C. or by exposure to vacuum or by a combination of low temperature and vacuum exposure. In low temperature and pressure (LTP) processing, the gel initially shrinks due to capillary stresses developed during drying, but because the gel does not react with itself in the shrunken state, it can springback at the final stage of drying as the capillary stress vanishes. If unconstrained, the springback restores the full original volume of the gel. If constrained by the container volume, the aerogel conforms to the shape of the container. The result is a cavity filled with aerogel that requires no supercritical processing and no molding or machining operations. Additionally, when gels are derivatized while in their final form, the springback process can be reversed by exposure to an appropriate solvent. Thus, the silica gel can be re-used and importantly, be removed easily with a liquid solvent. FIG. 2 shows how the volume of the aerogel was decreased in one embodiment upon partial removal of the fluid component and then, upon subsequent further removal of the fluid component, the volume of the net-shaped aerogel increased to approximately the original volume.

In another embodiment, the sol is first prepared and aged to form a gel. Prior to forming the gel into a final shape, the gel is derivatized to render the exposed gel surfaces unreactive toward further condensation. The gel is then re-formed into some final shape, such as a powder, bulk pieces, and granules (such as aerobeads). The final shaped material is then dried to remove a portion of the liquid component of the gel to achieve volume reduction. The surfaces of these shaped materials can then optionally be derivatized by reacting the surface terminal sites to render the surfaces unreactive toward further condensation. The shaped materials can be stored for later use or immediately put into a cavity and further dried to cause springback. In contrast to the formed gel material of the previous embodiment prepared by derivatizing the surface of the gel in its final shape, this material can exhibit some degree of surface reactivity as a result of underivatized (reactive) surfaces that can be re-exposed during the final shaping process (such as cutting, mechanical disruption, and other conventional physical and mechanical processing techniques). These surfaces can react following springback to promote "healing" at the interparticle interfaces by heating to promote silanol condensation, but can also prevent or minimize reversibility.

The method of the present invention provides the fabrication of shapes, in near-net dimensions, without expensive autoclave processing and without molding and machining, such as occurs when conventional supercritical routes to aerogel materials are utilized. High pressure processing can cause chemical and physical changes to occur such as alcoholysis reactions, formation of carbonates, and crystallization. For supercritical processing, the minimum pressure required is established by the critical pressure of the pore fluid, whereas, in LTP processing, drying occurs with no externally applied pressure. However, the method of the present invention has distinct advantages over the LTP method for preparation of bulk materials. The LTP process still depends upon casting the gel into a mold and thus presents problems similar to supercritical processing with regard to molding technology and production of shapes, e.g. mold design, filling, material selection, mold release, part shrinkage, and difficulty in processing large and/or complex shapes. Existing granular aerogel processes are relatively simple but granular aerogel would require even further processing (high pressure compression or complex filling of intergranular voids) to form monolithic, bulk aerogels. For some applications (e.g., thermal insulation), gas phase conduction in intergranular regions degrades performance. Intergranular diffusion would be undesirable for many insulation applications. The method of the present invention combines the ease of granular aerogel processing with the ability to form aerogel in-situ in a near-net shape geometry. The method of the present invention eliminates the need for molding and machining, imparts greater strength if the granules are maintained under uniform compressive stress, reduces processing time by using small granules, and yields a material that fully conforms to the container that can be used in any geometric configuration. Unlike supercritical processing routes to aerogels, this method can be easily adapted for continuous processing or large volume production and is reversible to accommodate recycling, restoration, or repair operations.

Additionally, to make bulk aerogel shapes using any current process requires careful handling of the fragile gel followed by processing under complex conditions that avoid fracture and uncontrolled shrinkage. Using traditional aerogel manufacturing techniques, it is difficult to fill a cavity with an aerogel when the cavity contains internal obstructions such as wires, leads, baffles, and channels. The method of the present invention can be used in applications where it is desirable to have a cavity with internal structure that is completely filled with aerogel. One such application includes insulation. Conventional insulating materials include organic foams (e.g. polystyrene, polyurethane) and inorganic insulation such as fiberglass, fibrous ceramics. Aerogel insulation, a highly porous inorganic material, avoids many of the problems associated with conventional insulating materials. As compared to conventional thermal insulation such as fiberglass (thermal resistance, R/inch=3) and polyurethane (R/inch=6), aerogels have thermal resistances of R/inch=12–15. The superior thermal insulating capability of aerogel leads to insulation that is lighter weight and occupies less volume. Its inorganic nature imparts greater thermal stability than organic materials. As with conventional aerogel, incorporation of a second phase (such as carbon particles) can be used to modify thermal conductivity at selected wavelengths.

Appropriate sols for this invention include so-called particulate and polymeric sols. Sol compositions include but are not limited to aqueous or alcoholic colloidal dispersions of ceramics such as $SiO_2$, $Al_2O_3$, $TiO_2$, $ZrO_2$, and their hydrated or alkoxylated derivatives; partially or fully hydrolyzed metal alkoxides ($M(OR)_n$), where M is a metal and R is an organic ligand, preferably an alkyl group; partially or fully hydrolyzed organically substituted metal alkoxides ($R'_xM(OR)_{n-x}$, where R' is a non-hydrolyzable organic ligand), metals, metal carbides, metal nitrides, metal chalcogenides, and other colloidal dispersions already well understood in the art. The colloidal sol comprises at least one metal oxide, metalloid oxide, hydroxide, alkoxide, oxohydroxide, or oxoalkoxide. The fluid component of the sol includes but is not limited to water, alcohol, or other organic fluids such as hexane, cyclohexane, toluene, tetrahydrofuran, acetonitrile, methoxyethanol, or multicomponent (preferably miscible) fluid mixtures. The only practical requirements of the sol are that it remain stable, i.e., not precipitate during the gelation and shaping operations, and that its viscosity and concentration be appropriate for the pertinent shaping operation. (don't know what's wrong with spacing in this section)

As will be obvious in the following discussion, gelation of the sol can facilitate subsequent processing steps such as aging, solvent exchange, and silylation. Gelation of the sol can be accomplished by a variety of techniques familiar to practitioners of the art including aging, addition of acid or base, addition of salt, application of heat, or application of light.

Aging refers to storage of the sol or gel normally in a quiescent state under conditions appropriate to further the extent of catalysis, hydrolysis, condensation, and/or ripening. In the context of this invention, aging is used prior to gelation to grow and strengthen primary sol particles, clusters, or aggregates (this may lead to gelation, depending on sol concentration) and/or after gelation to strengthen the gel network. For sol clusters characterized by a mass fractal dimension, cluster growth increases the average cluster porosity. Thus aging can be used to increase the resistance of the network to collapse under the applied capillary pressure developed during drying and/or to increase the porosity of the primary structural units contained in the sol, gel, and ultimately the aerogel. Appropriate aging conditions include but are not limited to 25–90° C. and proton concentrations of $10^{-1}$ to $10^{-12}$ M.

In the context of the present invention, surface derivatization refers to the reaction of reactive terminal sites existing on the surfaces of the sol clusters or gel such as hydroxide, alkoxide, halide, etc. with molecules, oligomers, or polymers that render the surface unreactive toward further condensation and/or modify the liquid-solid contact angle. Appropriate derivatizing agents include but are not limited to organofunctional silanes such as chlorosilanes ($R'_xSiCl_{4-x}$, where R' is preferably an alkyl or fluoroalkyl ligand); alkoxysilanes ($R'_xSi(OR)_{4-x}$, where R is an alkyl ligand and R' is a non-hydrolyzable ligand such as alkyl, fluoroalkyl, or amine); alcohol amines, e.g. triethanol amine; carboxylic acids, e.g. acetic acid; or β-diketonates, e.g. acetylacetonate. Reactions with the sol or gel surfaces may be carried out in organic solvent or water. Alternatively the derivatizing agents can be partially hydrolyzed and reacted as oligomers. The derivatized surface can exist as a monolayer or as a multilayer. Surface derivatization can also be at least partially accomplished during the sol preparation step when organic substituted metallic alkoxides, $R'_n M(OR)_{z-n}$, are used as precursors.

Fluid exchange can optionally be performed in the sol or gel state to alter the fluid surface tension and solid-liquid contact angle, promote or retard aging, alter the evaporation rate during drying, and influence the extent of surface derivatization. For gels, fluid exchange can be accomplished by repeated washing of the gel in excess volumes of the fluid of choice. For sols, fluid exchange can be performed by distillation of lower boiling point fluids or azeotropic compositions along with replenishment of the fluid of choice. Appropriate fluids include but are not limited to: water, alcohols, hexane, cyclohexane, toluene, acetonitrile, acetone, nitromethane, and dioxane.

The fluid portion of the precursor gel can be removed by thermal or chemical treatment. The solvent, such as an alcohol or other organic solvent, is at least partially removed, such as by drying. The drying process can be accomplished at relatively mild temperatures, where the temperature utilized is sufficient to remove the organic solvent. This temperature is generally in the range of 20° C. to 150° C. Optionally, chemical treatments such as ozonolysis, oxygen plasma, photolysis, and selective dissolution can be used to remove residual organic constituents to confer additional porosity to the aerogel Obviously more than one organic ligand can be utilized in the synthesis and/or derivatizing steps to arrive at a composite structure in which some organic groups are removed to create porosity, while some are retained to provide hydrophobicity.

The extents of both shrinkage and springback, and hence the porosity of the aerogel, are conveniently controlled through the choice and surface coverage of derivatizing or modifying agent(s), the aging time; the degree of constraint on springback (container volume relative to total granule volume) and the time at temperature used to partially remove the solvent in the precursor sol or gel.

An added advantage to the method of the present invention is improvement in mechanical strength of aerogels. In this process, the aerogel granules are allowed to springback and deform to fill a cavity. If complete springback is constrained by the dimensions of the container, the aerogel will be placed under compressive stress. It is well known (for example, from glass tempering processes) that glass (i.e., aerogel) under compression demonstrates superior mechanical strength.

EXAMPLES

Example 1

Net-Shaping in a Flow Tube

The general two-step sol-preparation process was used to prepare the "precursor" silica gel. The precursor sol is generally prepared from tetraalkoxysilanes, an alkoxysilane, such as tetraethylorthosilicate or tetramethylorthosilicate, or a metal alkoxide, including titanium butoxide, titanium iso-propoxide, zirconium n-butoxide, aluminum iso-propoxide, aluminum iso-propoxide, and mixtures thereof, using a solvent and an acid or base. In one standard processing method, the first step of this process involves hydrochloric acid catalysis of the hydrolysis of tetraethyl orthosilicate (TEOS); the second step involves base catalysis (for example, with ammonium hydroxide) so that the condensation of silanol groups resulting from the hydrolysis will proceed at a useful rate.

Relative to TEOS, the molar amounts of reactant (water), solvent (ethanol) and catalyst (HCl) utilized in the first step were 1, 3.8 and 0.0007, respectively. This mixture was heated with stirring at 60° C. for 2 hr in a reaction vessel equipped with a water-cooled condenser. In the second step, 0.50 M ammonium hydroxide solution (corresponding to a molar amount of 0.024) was added to the product of the initial reaction. This mixture was aged for 24 hr at 50° C. in an oven, during which time gelation occurs. The gel was then washed, first with ethanol to reduce the concentration of water in the gel, and then with heptane to extract the ethanol. Each wash involved a 2:1 solvent-to-gel volume ratio, and was conducted at 50° C. for 1 hr.

To obtain an aerogel at ambient pressure, the precursor silica gel was first reacted with trimethylchlorosilane (TMCS) or hexamethyldisilazane (HMDS) introduced as a hexane, heptane or other alkane solution. The reaction was allowed to proceed for 20 hr at 50° C. Because HCl or $NH_4OH$ is produced as a byproduct, one final wash with the alkane solvent was performed. To produce a powder, the bulk gel was first broken up into large pieces and transferred to an open polyethylene cup. The mass of the gel was monitored as the solvent evaporated so that the desired initial solvent content (ISC) was achieved. The gel was then ground with a mortar and pestle, and passed through an intermediate-sized sieve. The resultant powder was stored in a freezer.

To demonstrate that this silica gel powder expanded and deformed to fill the volume of a cavity, a flow tube test was developed. In this test, the powder was introduced to a stainless steel tube 0.45 cm in diameter and 5.0 cm in length. The tube is tapped gently on the benchtop as the powder is poured into it through a small funnel. Stainless steel frits (Supelco) with an average pore diameter of 2 μm were then coupled to both ends of this tube. The tube was weighed before and after the introduction of the powder. Nitrogen gas at 100 kPa was then passed through the tube for 15 min. At the beginning and end of this time period the flow rate was determined using a soap bubble flowmeter and stopwatch. The tube was then detached from the gas supply and weighed again. To evaporate the last traces of solvent from the powder, the tube was placed in an oven at 125° C. for 2 hr. After cooling to room temperature, the flow rate and the mass of the tube were determined once again. The four tube mass values were used to calculate the solvent content at the beginning of the test (the ISC), and after the 15 min of gas flow through the tube.

With an ISC of 61 wt % heptane, the flow rate decreased by nearly three orders of magnitude (from 110 to 0.13 mL/min) during the test. When the tube was dismantled at the end of the experiment, the powder oozed out, indicating that it had been under pressure within the tube. These results demonstrated that the powder volume increased into the void volume as the last amount of solvent was evaporated from it and that springback did occur in the silica gel powder produced by the method of the present invention, thereby achieving net-shaping in the flow tube.

Treatment of the gel with TMCS was considered to be necessary for any springback to occur for this test. To verify this conclusion, several batches of gel were treated with different amounts of TMCS. With a TMCS/TEOS ratio of 0.30, a significant decrease in the flow rate is observed, and with a ratio of 0.37 the flow rate decrease is three orders of magnitude. It should be noted that a significant amount of the TMCS added in these experiments was consumed through a side reaction that results in the formation of a liquid phase that is immiscible with heptane. This phase was observed to decrease in volume and finally disappear as the number of heptane washes prior to derivatization was increased from two to six. Thus, it is hypothesized that the by-product is trimethylethoxysilane, produced through reaction of TMCS with residual ethanol in the gel.

Nitrogen gas adsorption measurements at 77 K were used to characterize two powder samples produced in this study. The results confirm that treatment of the gel with TMCS provides a lower density powder after the solvent has been completely evaporated, compared to non-derivatized granules.

Finally, the reversibility of spring-back in these materials was considered. One batch of gel was processed into a powder and then split into three portions. One portion (the "virgin" sample) was tested in the flow tube test immediately. The other two portions were exposed to the atmosphere at room temperature for a period of 24 hr, so that the heptane could completely evaporate. The powder was then "regenerated", either by exposing the material to heptane vapor, or by saturating it with liquid heptane. In the latter case, the heptane content was subsequently reduced by evaporation to an ISC value of 47 wt %. Re-absorption of heptane from the vapor is not particularly efficient (a maximum ISC value of 25 wt % was attained), and powder regenerated in this manner did not exhibit significant springback. In contrast, the addition of heptane liquid provided a high ISC, and a significant reduction in the flow rate through the tube. While the final flow rate observed with this regenerated material was not as low as that observed with the "virgin" powder, the initial flow rate was higher, so that the relative decrease in the flow rate may be the same for the two materials. These results demonstrate that springback can be reversible.

Example 2
Net-Sharing into a Square Cavity

In another embodiment, net-shaping of a single formed cylindrical aerogel granule into a square cavity was demonstrated. Gels were prepared using the two-step sol-preparation process as described in Example 1. After casting into a cylindrical shape, the final sol was aged at 50° C. for 24 hours during which time gelation occurs. The gel was removed from the original cavity, washed in ethanol, washed in hexane, derivatized with 5% TMCS in hexane for 24 hours at 50° C., and washed again in hexane. A single formed cylindrical aerogel granule, after already being partially dried at 37° C., was placed in a square, glass cavity and the cavity heated at 50° C. to achieve further drying. The gel sprung back, increasing its volume during the drying to completely fill the square cavity within a few hours, achieving net-shaping into the square cavity. To demonstrate reversibility, the square mold with the dried aerogel was placed in a closed container and exposed to a solvent, in this case heptane, for 12 hours. The aerogel sample shrunk again to approximately its original (partially dried) size. After solvent exposure and shrinkage, the sample was reheated and recovered its expanded cross-section and volume, demonstrating the elasticity and reversibility of the process.

In another embodiment, multiple cylindrical aerogel granules, after already being partially dried at 37° C., were placed in a square, glass cavity and the cavity heated at 50° C. to achieve final drying. The gels sprung back and deformed so that their surfaces conformed to one another, thus increasing their volume during the drying to completely fill the square cavity within a few hours, achieving net-shaping into the square cavity.

The invention being thus described, it will be apparent that the same may be varied in many ways. Such variations are not to be regarded as a departure from the spirit and scope of the invention, and all such modifications as would be obvious to one skilled in the art are intended to be included within the scope of the following claims.

We claim:

1. A method of net-shaping using an aerogel material, comprising:
   forming a sol;
   aging the sol to form a gel, said gel having a fluid component;
   forming the gel into a final shaped gel material;
   derivatizing the final shaped gel material to render the material unreactive toward further condensation;
   removing a portion of the fluid component of said final shaped gel material to form a partially-dried medium;
   placing said partially-dried medium into a cavity, wherein the volume of said medium is less than the volume of the cavity; and
   removing a portion of the fluid component of the medium, said removal causing the volume of the medium to increase, thereby forming a net-shaped aerogel material.

2. The method of claim 1 wherein the sol comprises at least one metal oxide, metalloid oxide, hydroxide, alkoxide, oxohydroxide, or oxoalkoxide.

3. The method of claim 1 wherein aging occurs by a method selected from the group consisting of heating the sol, adding an acid to the sol, and adding a base to the sol.

4. The method of claim 1 wherein the step of derivatizing the final shaped gel material is performed by adding a derivatizing agent, said derivatizing agent selected from the group consisting of an organofunctional silane, an alcohol amine, a carboxylic acid, and a β-diketonate.

5. The method of claim 4 wherein the derivatizing agent is selected from the group consisting of trimethylchlorosilane and hexamethyldisilazane.

6. The method of claim 1 wherein no external pressure is applied.

7. The method of claim 1 wherein removing a portion of the fluid component is accomplished by a method selected from the group consisting of heating, applying a vacuum, and simultaneously heating while applying a vacuum.

8. The method of claim 7 wherein heating is performed at a temperature of approximately less than 50° C.

9. The method of claim 1 wherein the final shaped gel material is selected from the group consisting of a powder, bulk material, and granules.

10. The method of claim 1 wherein the step of removing a portion of the fluid component results in a decrease in volume of said gel.

11. The method of claim 10 wherein the decrease in volume is greater than approximately 50 percent.

12. The method of claim 1 wherein the net-shaped material is under compressive stress.

13. The method of claim 1 further comprising the step of adding a solvent to said net-shaped material to reduce the volume of the material, thereby facilitating removal of the material from said cavity.

14. The method of claim 1 wherein the partially-dried medium is stored prior to placing said partially-dried medium into a cavity.

15. The method of claim 1 wherein the final shaped gel material is formed simultaneously with the step of aging the sol to form the gel.

16. A method of forming a net-shaped aerogel material, comprising:

forming a sol;

aging the sol to fom a gel material, said gel material having a fluid component;

derivatizing the gel material to render the material unreactive toward further condensation;

forming the gel material into a final shaped gel material, thereby creating newly-exposed surfaces;

removing a portion of the fluid component of said final shaped gel material to form a partially-dried medium; and placing the partially dried medium into a cavity, wherein the volume of said medium is less than the volume of the cavity and a portion of the fluid component of the medium is removed, said removal causing the volume of the medium to increase, thereby forming a net-shaped aerogel material.

17. The method of claim 16 wherein the net-shaped material is derivatized to render the newly-exposed surfaces unreactive toward further condensation.

18. A method of net-shaping using an aerogel material, comprising:

forming a sol;

forming the sol into a shaped sol material;

aging the shaped sol material to form a final shaped gel material, said gel material having a fluid component;

derivatizing the final shaped gel material to render the material unreactive toward further condensation;

removing a portion of the fluid component of said final shaped gel material to form a partially-dried medium;

placing said partially-dried medium into a cavity, wherein the volume of said medium is less than the volume of the cavity; and removing a portion of the fluid component of the medium, said removal causing the volume of the medium to increase, thereby forming a net-shaped aerogel material.

19. A method of net-shaping using an aerogel material, comprising:

hydrolyzing tetraethyl orthosilicate in the presence of an acid;

catalyzing with base, further hydrolyzing tetraethyl orthosilicate with said base to form a colloidal sol;

aging the colloidal sol at approximately 50° C. to form a gel, said gel having a fluid component and exposed surfaces;

derivatizing the exposed surfaces of the gel with trimethylchlorosilane in heptane to render the surface unreactive toward further condensation;

forming the gel into a gel medium selected from the group consisting of a powder, bulk material, and granular aerobeads;

removing a portion of the fluid component of said gel medium to form a partially-dried material;

placing the medium into a cavity, wherein the volume of said medium is less than the volume of the cavity; and removing a portion of the fluid component of the medium, said removal causing the volume of the medium to increase and form a net-shaped aerogel material.

20. The method of claim 19 wherein heptane is incorporated into the fluid component of said gel.

21. The method of claim 19 wherein the gel medium is a powder.

22. The method of claim 21 wherein the net-shaping aerogel material is exposed to a solvent, thereby re-forming the net-shaping aerogel material into a powder.

* * * * *